(12) United States Patent
King et al.

(10) Patent No.: US 11,787,647 B2
(45) Date of Patent: Oct. 17, 2023

(54) SUPPORT SYSTEM FOR MEAT CONTAINER

(71) Applicant: COZZINI LLC, Elk Grove Village, IL (US)

(72) Inventors: Edwin Earl King, Lombard, IL (US); Christopher Andrew Brown, Algona, IA (US); Randall Scott Rhude, Platte City, MO (US)

(73) Assignee: COZZINI LLC, Elk Grove Village, IL (US)

( * ) Notice: Subject to any disclaimer, the term of this patent is extended or adjusted under 35 U.S.C. 154(b) by 260 days.

(21) Appl. No.: 17/433,930

(22) PCT Filed: Oct. 9, 2020

(86) PCT No.: PCT/US2020/055039
§ 371 (c)(1),
(2) Date: Aug. 25, 2021

(87) PCT Pub. No.: WO2022/076000
PCT Pub. Date: Apr. 14, 2022

(65) Prior Publication Data
US 2023/0136201 A1 May 4, 2023

(51) Int. Cl.
*B65G 65/23* (2006.01)
(52) U.S. Cl.
CPC ...... *B65G 65/23* (2013.01); *B65G 2201/0202* (2013.01)
(58) Field of Classification Search
CPC ..................................................... B65G 65/23
See application file for complete search history.

(56) References Cited

U.S. PATENT DOCUMENTS

| | | | |
|---|---|---|---|
| 3,279,635 A * | 10/1966 | Avery | B65G 65/23 414/420 |
| 3,978,999 A * | 9/1976 | Ryder | B65G 65/23 414/404 |

(Continued)

FOREIGN PATENT DOCUMENTS

| CN | 208471075 | 2/2019 |
|---|---|---|
| CN | 209871769 | 12/2019 |

OTHER PUBLICATIONS

Backsaver, "Backsaver CD COMCO BIN DUMPER," retrieved from the Internet: https://web.archive.org/web/20200928064239/ https://www.backsaver.nl/products/backsaver-cd-en/# (retrieved Jun. 25, 2021).

(Continued)

*Primary Examiner* — Jonathan Snelting
(74) *Attorney, Agent, or Firm* — Barnes & Thornburg LLP

(57) ABSTRACT

A system to retain a bag within a container when rotated by a chute is provided. The system includes a linkage that pivots a second arm and a hook between a release position and a holding position, the linkage comprising an input, a first arm, and the second arm that supports the hook, and a fixed plate. The input is connected to a first arm such that movement of the input pivots the first arm. The second arm is pivotably connected to the first arm at a second end of the first arm, a spring is disposed at the pivotable connection between the first and second arms and is provided to bias the second arm toward a position where the second arm extends along a line that is substantially co-linear with a longitudinal axis through the first arm. The hook extends from an extended end portion of the second arm.

22 Claims, 9 Drawing Sheets

(56) References Cited

U.S. PATENT DOCUMENTS

| | | | | |
|---|---|---|---|---|
| 4,095,707 | A | * | 6/1978 | Kowtko ................. B65G 65/23 |
| | | | | 414/407 |
| 5,302,073 | A | | 4/1994 | Riemersma et al. |
| 6,254,330 | B1 | | 7/2001 | Steffen et al. |
| 6,379,034 | B1 | * | 4/2002 | Schutz ................. B67D 3/0051 |
| | | | | 414/408 |
| 2003/0049106 | A1 | | 3/2003 | Lybarger |

OTHER PUBLICATIONS

Conventional Machines (believed to be publically available before Oct. 9, 2020).

Cozzini, "VAT/COMBO DUMPER," retrieved from the Internet: http://www.cozzini.com/PDF_2012/ENG/CVD_VatDumper_Eng.pdf (retrieved on Jun. 24, 2021).

Flexicon, "TIP-TITE Now improve bulk dumping 4 ways with TIP-TITE Dumpers from Flexicon," retrieved from the Internet: http://web.archive.org/web/20180921110330if_http://flexicon.com:80/Bulk-Handling-Equipment-and-systems/Drum-Box-Container-Dumpers/Flexicon%20Dumper%20ad.pdf (retrieved on Jun. 25, 2021).

Kohler Industries, "Cozzini Combo Dumper w/Pallet Retract," retrieved from the Internet: https://www.youtube.com/watch?v=1E0HGQECwl4&ab_channel=kohlerindustries, (retrieved on Jun. 25, 2021).

Search Report & Written Opinion issued in Appl. No. PCT/US20/55039 (2021).

* cited by examiner

SUPPORT SYSTEM FOR MEAT CONTAINER

CROSS-REFERENCE TO RELATED APPLICATIONS

This application is a US national stage application under 35 USC § 371 of PCT Application No. PCT/US2020/055039, filed Oct. 9, 2020, the entirety of which is hereby fully incorporated by reference herein.

BACKGROUND

The subject disclosure is related to systems for automatically dumping components from a container for a manufacturing process, food processing process or the like. Often containers include an inner bag that holds the components within the container, which provides a cleanliness barrier between the components and the container, as well as various other benefits. Often when the container is rotated by a chute to a dumping position the bag will fall out of the container along with the components of the container, which could lead to problems with the manufacturing or food processing process, especially if the bag is not quickly recovered from the location where the components were deposited when dumping the container.

BRIEF SUMMARY

A first representative embodiment of the disclosure is provided. The embodiment includes a system to retain a container. The system includes a hopper comprising a chute, a floor, and a rotation mechanism which selectively moves the hopper from a first position where a container is supported upon the floor, and a second position wherein contents from within the container fall out of the container due to the force of gravity. A retaining mechanism is provided and couples, a linkage that pivots a second arm and a hook between a release position and a holding position, the linkage comprising an input, a first arm, and the second arm that supports the hook, and a fixed plate. The input is connected to the fixed plate at a first end thereof and where the input is additionally connected to the first arm such that movement of the input pivots the first arm, wherein the first arm is pivotably connected to the fixed plate. The second arm is pivotably connected to the first arm at a second end of the first arm, a spring is disposed at the pivotable connection between the first and second arms and is provided to bias the second arm toward a position where the second arm extends along a line that is substantially co-linear with a longitudinal axis through the first arm. The hook extends from an extended end portion of the second arm.

Another representative embodiment of the disclosure is provided. The embodiment includes a system to retain a container. The system includes a hopper comprising a chute, a floor, and a rotation mechanism which selectively moves the hopper from a first position where a container is supported upon the floor, and a second position wherein contents from within the container fall out of the container due to the force of gravity. A retaining mechanism comprising, a linkage that pivots a second arm and a hook between a release position and a holding position, the linkage comprising an input, a first arm, and the second arm that supports the hook, and a fixed plate. The input is connected to the fixed plate at a first end thereof and where the input is additionally connected to the first arm such that movement of the input pivots the first arm, wherein the first arm is pivotably connected to the fixed plate. The second arm is pivotably connected to the first arm at a second end of the first arm, a spring is disposed at the pivotable connection between the first and second arms and is provided to bias the second arm toward a position where the second arm extends along a line that is substantially co-linear with a longitudinal axis through the first arm. The hook extends from an extended end portion of the second arm, wherein the input is an air cylinder and a shaft, wherein the shaft includes a first portion and a piston disposed within the air cylinder and a second portion that extends out of the air cylinder, wherein an extended end of the second portion of the shaft is pivotably connected to the first arm, wherein the air cylinder has first and second air inputs, wherein when compressed air is received through the first input the shaft is urged to translate along a longitudinal axis of the shaft in a first direction where the extended end of the second portion of the shaft extends further away from the air cylinder toward to urge the second arm and hook toward the holding position where the second arm engages a container when the container is supported upon the floor of the chute, and a second input that when receiving compressed air therethrough causes the shaft translate along the longitudinal axis of the shaft in a second direction opposite to the first direction to urge the second arm and hook toward the release position where the second arm does not engage the container when the container is supported upon the floor of the chute, wherein translation of the shaft in the first direction results in the second arm rotating in the same direction as the first arm until the second arm engages the container either upon a side wall or an upper edge thereof when the container is positioned upon the floor of the hopper or the hook engages the side wall of the container when the container positioned upon the floor of the hopper, wherein when the second arm or the hook engages the wall of the side wall of the container, the second arm or the hook contacts a bag that is disposed within the container, wherein the hopper further comprises a holding bar, wherein when the container is rotated in toward the second position by the chute by the rotation mechanism, the container contacts the holding bar to prevent further movement of the container, wherein with rotation of the rotation mechanism the contents within the container are free to fall out of the container due to the force of gravity, and wherein when the contents fall out of the container the bag is prevented from falling with the contents due to the engagement between the second arm, the container and the bag or a pinched engagement between the hook, the bag, and the container.

Further embodiments of the disclosure are described in the Numbered Paragraphs below.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE PREFERRED EMBODIMENTS

Figure 1:
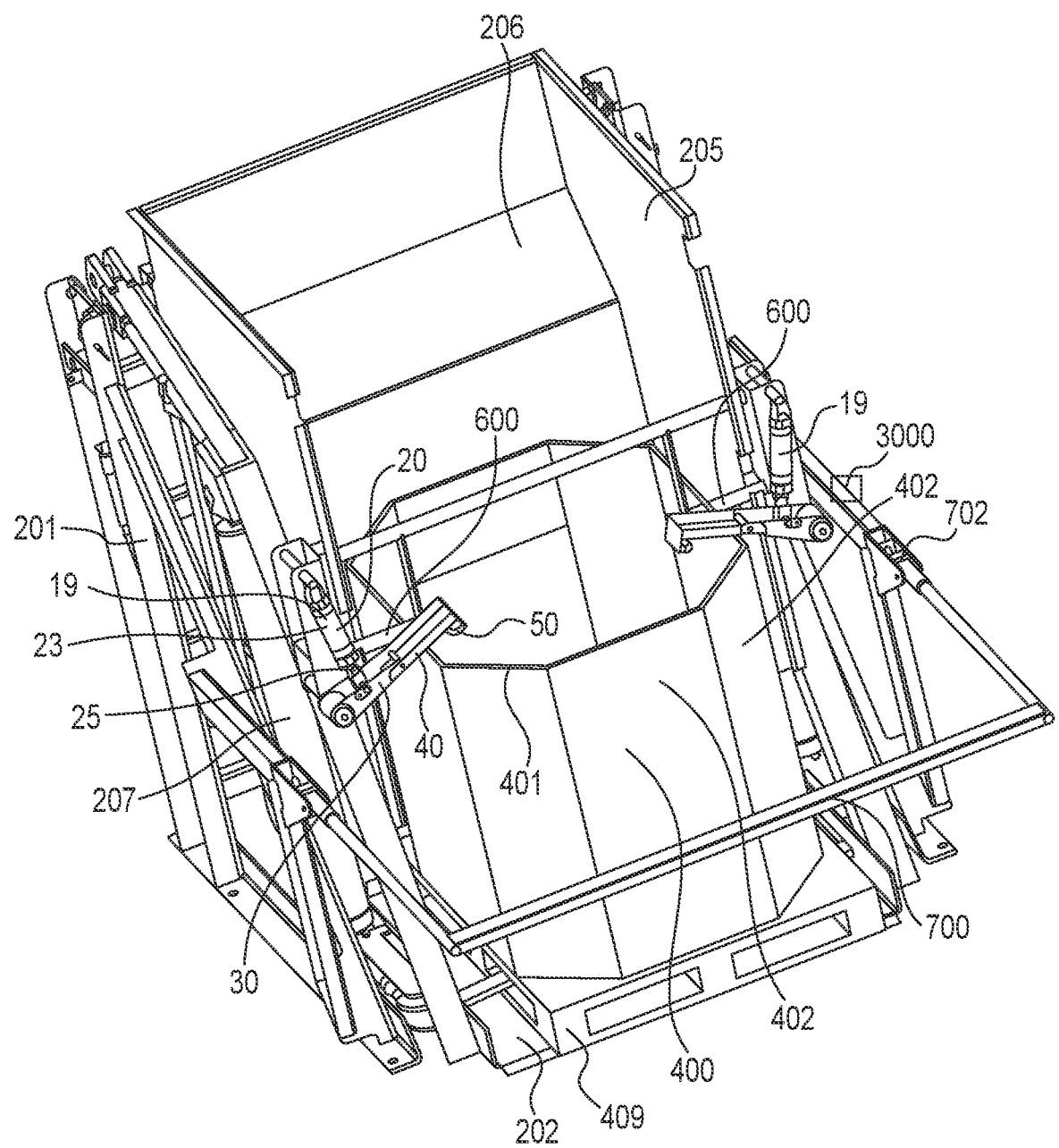
FIG. 1 is perspective view of a chute and dumping arrangement that includes a bag retention mechanism, with the bag retention mechanism in a withdrawn position.
Figure 2:
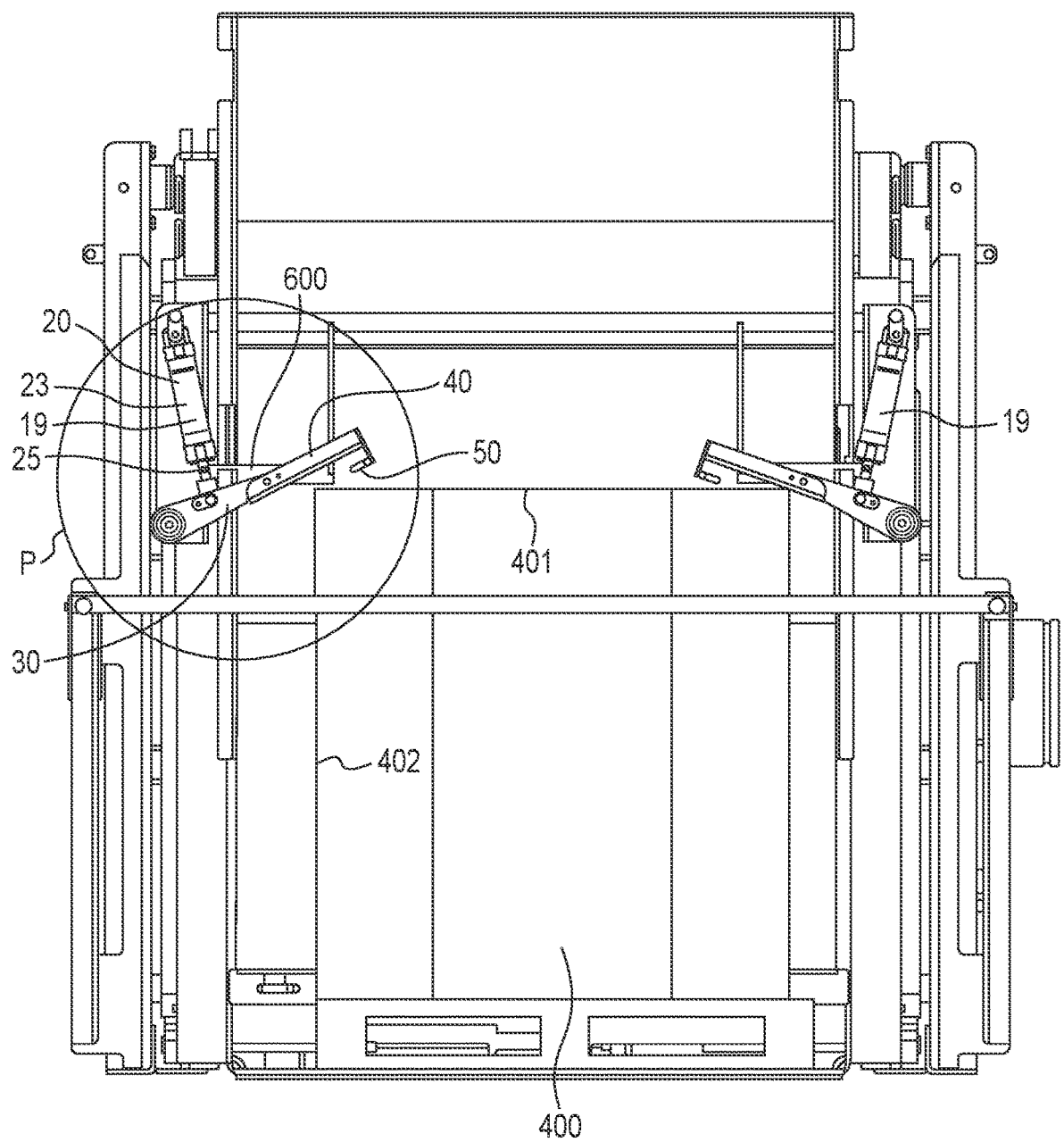
FIG. 2 a front view of the view of FIG. 1.
Figure 3:
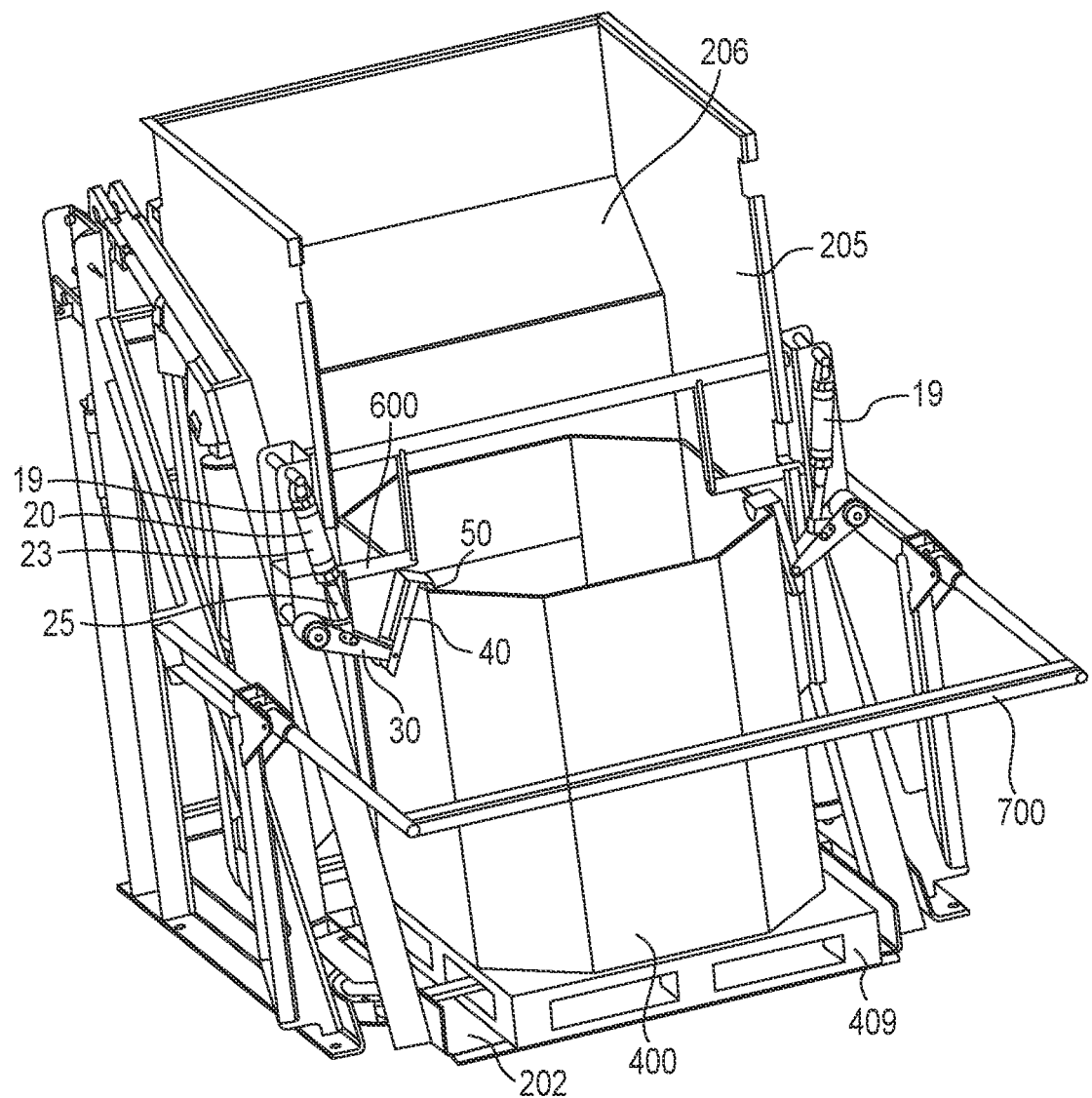
FIG. 3 is the perspective view of FIG. 1 showing the bag retention mechanism in an engaged position.
Figure 4:
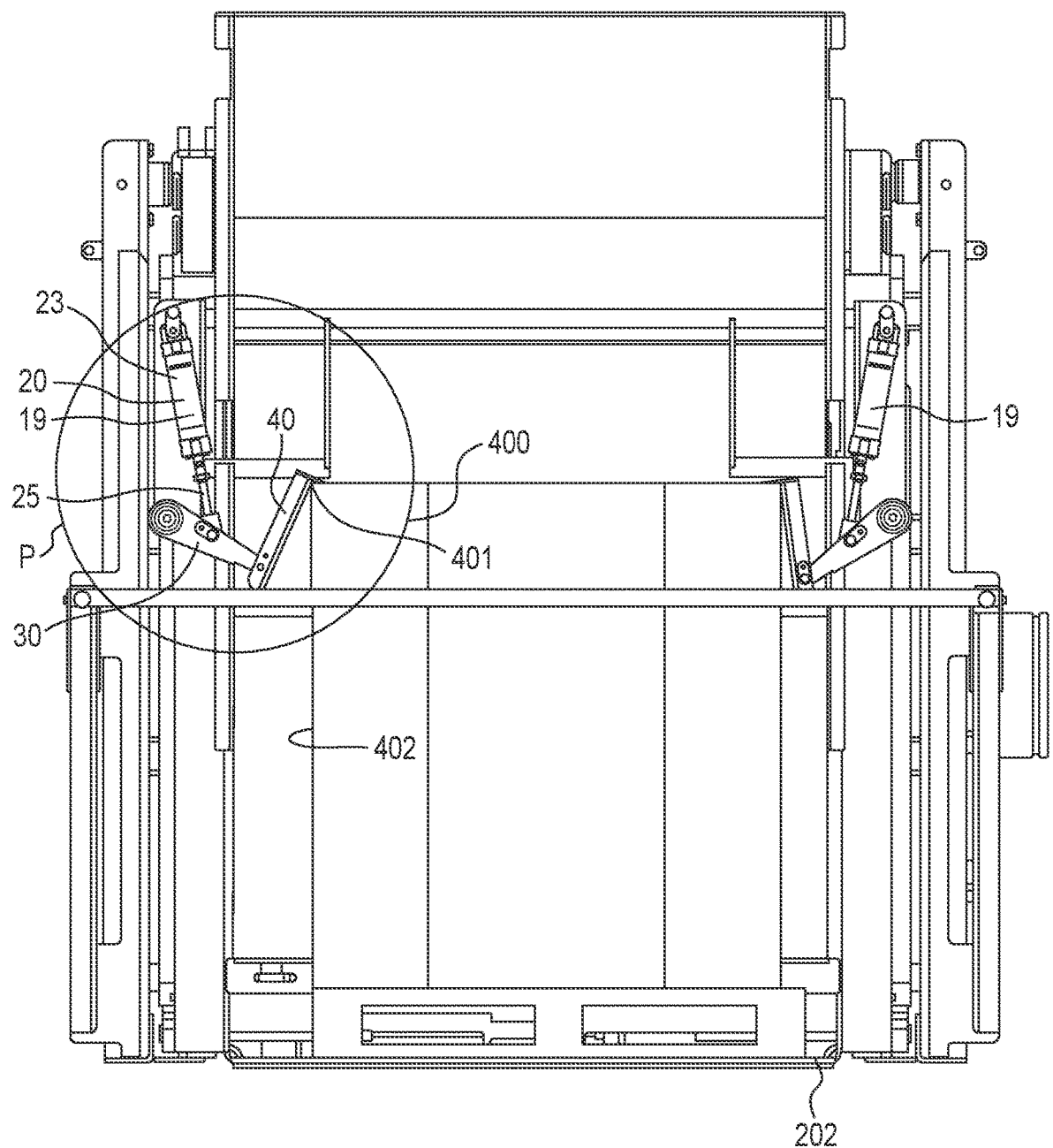
FIG. 4 is a front view of the view of FIG. 3.

Turning now to FIGS. 1-8b, a system 10 for retaining a bag within a container is provided. The system is configured to be used with a mechanism for dumping the contents of a container 400, such as a container of meat or other food in a food processing production line. The system 10 disclosed and discussed in detail herein is specifically configured to be used with a container 400 for storing meat for further processing, while the system 10 can be successfully used for other types of containers, which may be food, beverages, liquids, or other items (chemicals, gravel, wood chips, or various other types of components used in a large scale manufacturing process).

In some embodiments, the system 10 is configured to retain a bag 800 that is disposed within a container 400 such that the bag 800 does not fall out of the container when the container 400 is flipped to dump the contents of the container 400, such as for the contents to be used in a food processing application. The bag 800 may be sized such that it extends above the side walls 402 of the container 400, and in some embodiments, a portion of the bag 800 may extend over the upper edge 401 of the container and rest outside the side wall 402. The bag 800 is intended to provide a cleanliness barrier between the contents of the container and the walls and bottom of the container 400, which are often cardboard or sometimes wood. The bag 800 often is not fixed to the container 400 and therefore can be removed from the container 400, and often falls from the container 400 when the container is raised and rotated, such as by a chute, to dump the contents of the container 400.

The system 10, in some embodiments, is used with an automated dumping system for a container 10. The dumping system 200 includes a frame 201 that supports a chute that includes a rear wall 206 and right and left side walls 205, and a floor 202, upon which a container 400 is disposed. The container 400 is normally full, or partially full, of a food product, such as pieces of meat, vegetables, fruit, flour, sugar, or other edible materials, such that the contents of the container 400 are used in a food processing line. In some embodiments, the container 400 rests directly upon the floor, while in other embodiments, the container 400 may rest upon a conventional skid 409, which rests upon the floor. As depicted schematically in FIGS. 7 and 7a, the dumping system further includes a hydraulic system 207 that can lift the frame 201 and rotate the frame 201 such that the container 400 is partially or fully turned over such that the contents within the container 400 fall from the container due to the force of gravity and onto the chute, where the contents are directed into a portion of the food processing arrangement.

The dumping system 200 further may include a hold down bar 600. The hold down bar 600 is configured to be contacted by the container 400 when the container is partially or fully turned over such that the container does not fall out of the chute due to the force of gravity. The dumping system 200 further may include a safety rail 700, which extends out from the container 400 when received upon the floor 202 of the chute 200 and prevents personnel from being close to the container 400 when the dumping system is operated. The safety rail 700 may be normally in a stowed position, which is vertically above the hold down bar 600, and may automatically pivot downward to a lower position outside of the container, as shown in the figures. Alternatively, the safety bar 700 may be manually movable between the stowed position and the lower position. In some embodiments, the dumping system may have an interlock that prevents operation of the dumping system from lifting and rotating the chute (and therefore the container 400) unless the safety bar 700 is in the lower position.

The system 10 comprises a linkage 19 (or a plurality of linkages 19) that selectively engages the container 400 and the bag 800 to prevent the bag 800 from falling out of the container. The term engage is defined herein to include direct contact between the linkage 19, the container 400 (either side wall 402 and/or the upper edge 401) and the bag 800, as well as to include indirect contact between these three components in such a manner to apply a force or a pinching manner between the three components. Specifically, the linkage 19 operates to create a pinch point between an arm of the linkage or portion of the linkage and the bag 800 and in some embodiments between an arm, the side wall 402 (and/or top edge 401) of the container and the bag 800. This pinch point prevents the bag 800 from falling out of the container 400, or at least prevents the bag 800 from falling away from the container 400 and into the position upon the food processing line where the dumped contents of the container is received.

The linkage 19 may be supported by the frame 201 such that the linkage 19 moves and rotates as the frame is rotated to allow the contents to be dumped from the container 400. The linkage 19 may be fixed directly to the frame 201, or may be fixed to a plate 12 that is fixed to or with respect to the frame 201.

The linkage 19 includes an input 20, a first arm 30, and a second arm 40. In some embodiments, a hook 50 may extend from a second end portion 41 of the second arm 40 although this is not required for a design that can properly pinch the bag 800 with respect to the container 400. In some embodiments, a single linkage 19 is provided, while in the embodiment depicted in the figures two linkages 19 are provided that simultaneously operate to engage opposite sides of the container 400 (and opposite sides of the bag 800).

Figure 6:
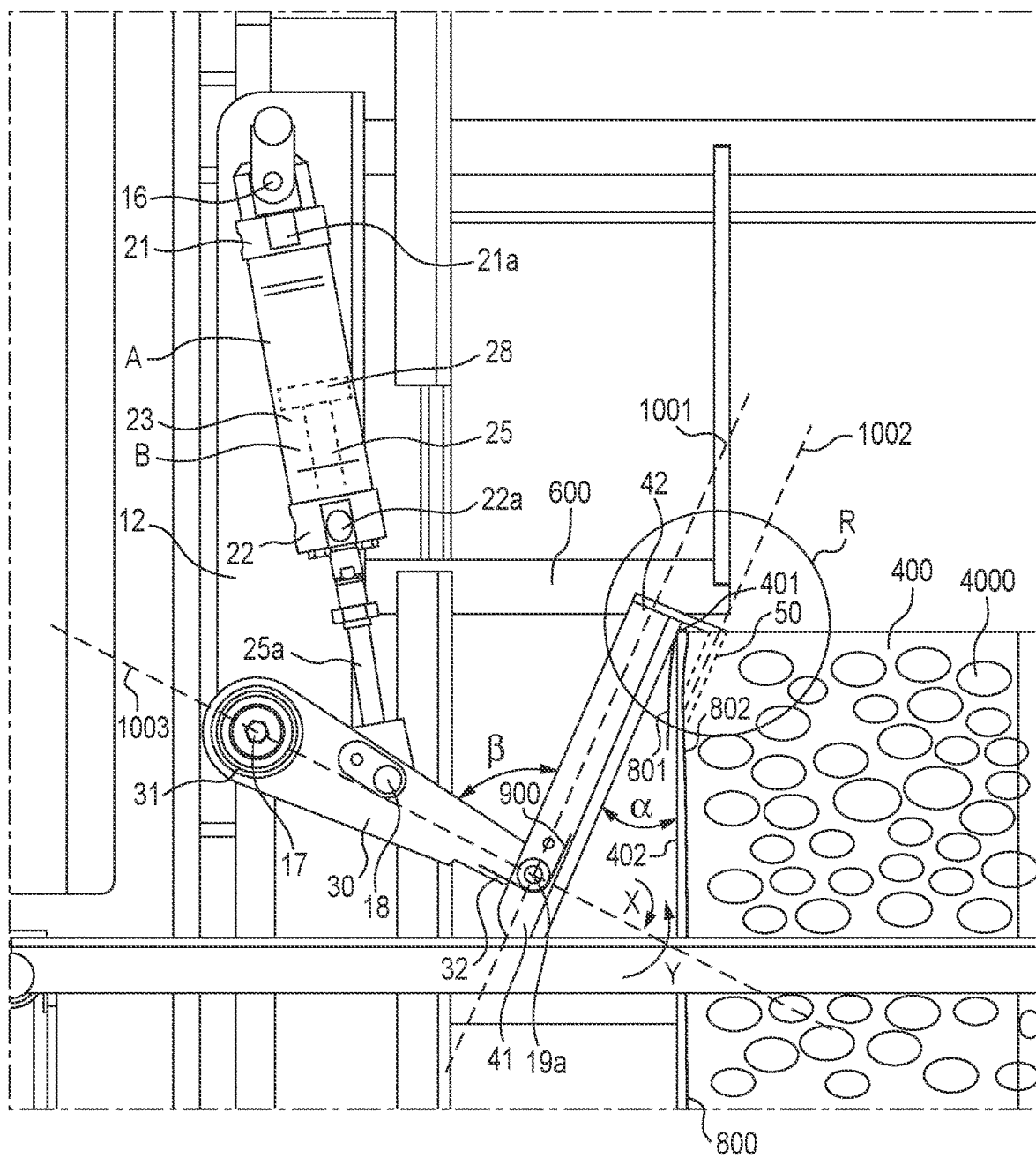
FIG. 6 is a detail view of detail Q of FIG. 4.

The input 20 may be a compressed air cylinder 23 with air inlet ports 21a, 22a disposed upon both the respective opposite ends 21, 22 of the air cylinder, and a piston 28 that is disposed within the air cylinder (FIG. 6 is broken lines). A shaft 25 is connected to the piston 28 with a portion of the shaft 25 extending out of the air cylinder. The piston 28 establishes a first volume (A) that is fluidly (gaseously) connected to the first air inlet port 21a, which is disposed at a first end portion 21 of the air cylinder 23, with a first side of the piston 28 establishing the first volume (A). The piston further establishes a second volume (B) that is fluidly (gaseously) connected to the second air inlet port 22a, which is disposed at a second end portion 22 of the air cylinder 23, with an opposite second side of the piston 28 establishing the second volume (B). The piston 28 and therefore the shaft 25 translates along the longitudinal axis of the shaft 25, which causes more or less length of the shaft 25 to extend out of the air cylinder, due to differential air pressure being established across the piston 28.

For example, when high pressure air is ported into the first volume (A) via the first air inlet port 21a the differential pressure across the piston 28 establishes a force that pushes the piston 28 within the air cylinder 25 in a directly that makes the first volume (A) larger and therefore translates the shaft 25 so that additional length of the shaft 25 extends out of the air cylinder 23. When high pressure air is introduced through the second air inlet port 22a, the air pressure in the second volume (B) may become greater than the first volume (A), which establishes a force upon the piston 28 that moves the piston within the air cylinder to increase the volume of the second volume (B) and decreases the volume of the first volume (A), thereby withdrawing more of the shaft 25 within the air cylinder. The first and second air inlet ports 21a, 22a may be connected to sources of high pressure air, such as an air compressor (not shown) via air hoses (not shown). A controller (3000, FIG. 7) may operate to selectively port or release air via the first and second air inlet ports 21a, 22a to result in piston 28 and shaft 25 moving in the desired direction to establish movement of the linkage 19, as discussed below. One of ordinary skill when reviewing this specification will understand that the shaft is moved 25 when there is a differential pressure across the piston 28, which can be achieved by adding high pressure air through one of the two ports 21a, 22a or releasing high pressure air through one of the ports, or a combination of the two. Further, as discussed below, forces may be applied to the shaft 25 via the linkage, which also may cause the shaft to translate, such as when the combination of the an applied force and the air pressure in the second volume (B) that is applied to the piston 28 overcomes the force applied to the other side of the piston 28 due to the air pressure in the first volume (A).

The input 20 may be connected to the frame 201 or to a plate 12 with a pivotable connection 16.

The shaft 25 has a portion 25a that extends out of the air cylinder 23, which the length of the extending portion 25a determined by the position of the piston 28 within the air cylinder 23. The extended end 25b of the shaft 25 makes a pivotable connection 18 with the first arm 30.

The first arm 30 is a rigid link that extends from a first end portion 31 to an opposite second end portion 32. The first arm 30 includes a pivotable connection 17 with the frame 201 or the plate 12, and a pivotable connection with the extended end 25b of the shaft 25. The first arm 30 further makes a pivotable connection 19 with the second arm 40. The pivotable connection 18 with the shaft 25 may be intermediate the pivotable connections 17 and 19 with the frame 201 and the second arm 40, respectively, such that movement of the shaft 25 becomes rotation of the first arm 30 and vice versa. One of ordinary skill in the art with a thorough review of the subject specification will be able to construct the linkage 19 for the desired movement with respect to the movement of the shaft 25 and with respect to a typical container 400 that is positioned upon the floor 202 of the chute with only routine skill in the art and without undue experimentation.

A longitudinal axis 1003 is defined along the length of the first arm 30, or more specifically between the pivot connections 17 and 19a, as best shown in FIG. 6. In some embodiments, the pivot connection 18 may extend through the longitudinal axis 1003, while in other embodiments the pivot connection 18 may be offset from the longitudinal axis 1003. The first arm may be a relatively straight member, or in other embodiments, the first arm may be another shape (round, arcuate, rectangular, or arbitrary). The shape of the first arm 30 may be dedicated by allow the first arm 30 the needed range of motion without impacting the frame 201, or limiting the size of container 400 that can be received upon the floor 202 of the chute.

The second arm 40 is a rigid link that extends from a first end portion 41 to to a second end portion 42. The second arm is pivotably connected to the second end portion 32 of the first arm 30 via a pivotable connection 19a. The second arm 40 supports a hook 50 that extends from the second end portion 42. The second arm 40 establishes a longitudinal axis 1001 that extends between the pivotable connection 19a and the end from where the hook 50 extends. As with the first arm 30, the second arm 40 may be a relatively straight member, or in other embodiments, the second arm 40 may be another shape (round, arcuate, rectangular, or arbitrary). The shape of the second arm 40 may be dedicated to allow the second arm 40 the needed range of motion without impacting the frame 201, or other components of the linkage, or limiting the size of container 400 that can be received upon the floor 202 of the chute.

Figure 5:
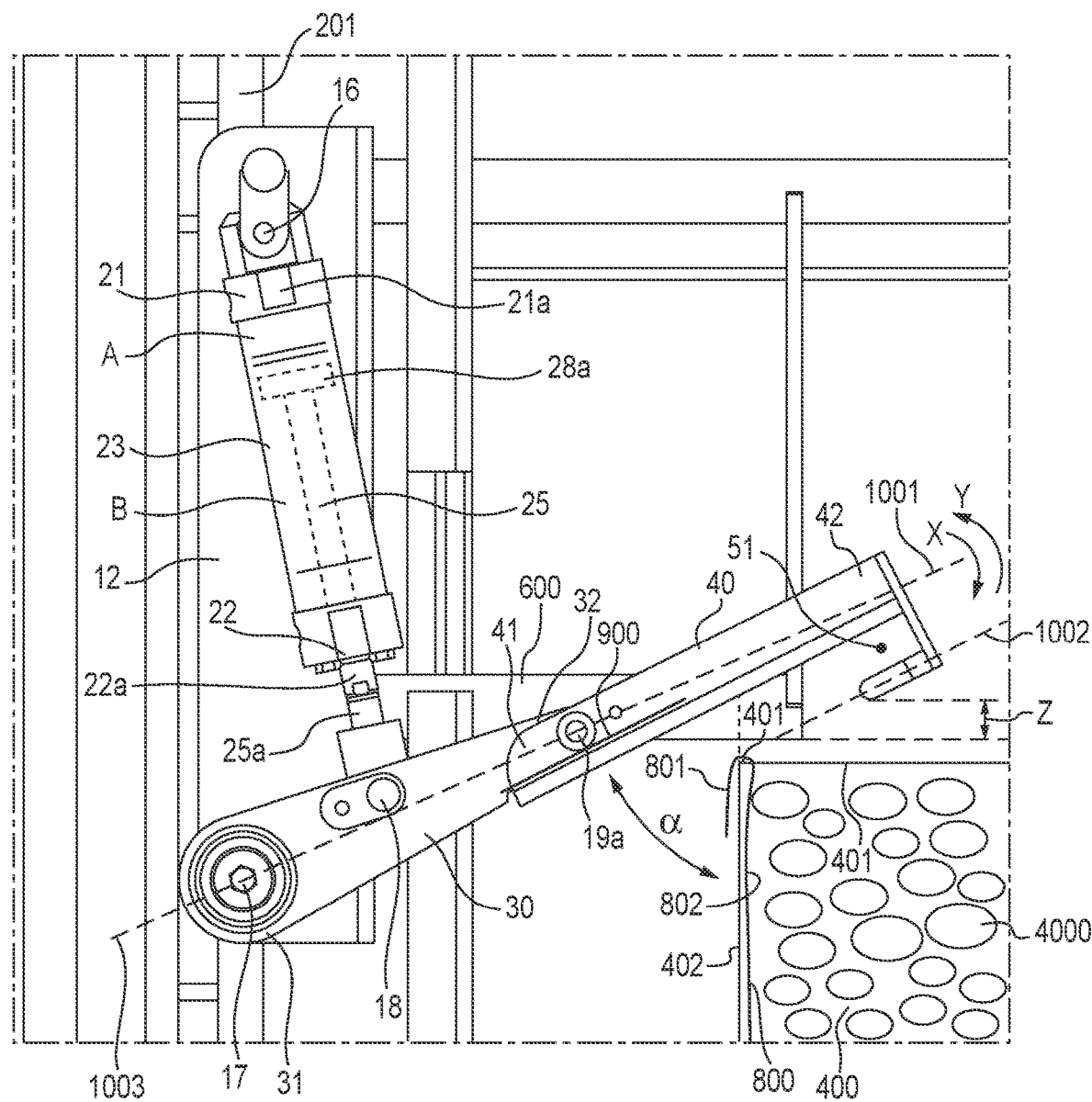
FIG. 5 is a detail view of detail P of FIG. 2.

In some embodiments, the pivotable connection 19a between the first and second arms 30, 40 may include a spring 900 (FIG. 5, schematic) or other biasing member to urge the second arm 40 to extend with respect to the first arm 30 such that the respective longitudinal axes are substantially co-linear, as depicted in FIG. 5. The term substantially co-linear is defined herein to mean exactly co-linear, and to also include relative positions where the longitudinal axes make an acute angle with each other that is less than 10 degrees. As depicted in FIG. 5, the longitudinal axes 1003 and 1001 both extend through the pivot connection 19a and the acute angle (if one exists when the spring 900 fully biases the second arm) between the longitudinal axes 1001, 1003 is measured with respect to the pivot connection 19.

The hook 50 extends from the second end portion 42 of the second arm 40. In some embodiments, the hook 50 may be a straight member that is offset from the second arm and extends in a direction where an axis 1002 through the hook is substantially parallel to the longitudinal axis 1001 through the second arm 40. The term substantially parallel is defined herein to include exactly parallel as well as well as including an acute angle in a range of up to 10 degrees. In other embodiments, the hook 50 may be a curved member that extends from the second end portion 42 of the second arm, or a member that extends with multiple portions that extend in a different direction. The hook 50 establishes a void 51 that is between the hook and the second arm 40.

The linkage 19, as controlled by the controller 3000, may extend between a first position (FIG. 5) and a second position (FIG. 6, shown with the hook 50 engaging the side wall 402 of a container 400), as controlled based upon the differential air pressure across the piston 28 within the air cylinder 23. The first position is depicted in FIG. 5, and is established when the shaft 25 is fully withdrawn (with an portion that establishes a the pivot connection 18 extending from the air cylinder 23), due to the air pressure in the second volume (B) being greater than the air pressure in the first volume (A), and the magnitude of the air pressure in the second volume (B) establishing a differential pressure upon the piston 28 that is greater than the downward force upon the shaft 25 and the piston 28 based upon the weight of the first and second arms 30, 40 of the linkage due to gravity (which in some embodiments tends to pull the shaft 25 out of the air cylinder 23. As discussed above, the second arm 40 is biased to establish a substantially co-linear position between the longitudinal axes 1003, 1001 extending through the respective first and second arms 30, 40.

As shown in FIG. 5, in the first position, the hook 50 and the portion of the second arm 40 that is aligned with where a container 400 could be received upon the floor 202 of the chute is disposed vertically above the height of the hold down bar 600, such that the linkage 19 does not interfere with the container 400 being placed upon the floor 200 of the chute from a side loading direction. As depicted in FIG. 5, the lowest portion of the hook 50 may be disposed at a distance Z above the bottom surface of the hold down bar to prevent interference.

Once the container 400 is placed upon the floor 202 of the chute, the linkage is transferred to the second position as depicted in FIG. 6. To move the linkage toward the second position the controller 3000 increases the air pressure within the first volume (A) within the air cylinder 23 such that the differential pressure across the piston 28 establishes a force to push the piston downward in the air cylinder to cause the shaft to translate in a direction to cause more length of the shaft to extend out of the air cylinder 23. This translation of the shaft 25 places a force upon the first arm, which causes the first arm 30 to rotate about its pivotable connection 17 (direction X, FIG. 6) with the frame 201/fixed panel 12. The rotation of the first arm 30 urges similar rotation of the second arm 40 due to the spring 900. After sufficient rotation in the direction X, the second arm 40 contacts the upper edge 401 of the container 400, which inputs a force to the second arm 40 against the biasing force of the spring 900. With additional rotation of the first arm 30 in the direction X, the second arm 40, due to the force thereon from the container rotates in the direction Y of FIG. 6. The alignment of the second bar 40 establishes an acute angle α with respect to the side wall 402 of the container, which is initially at its largest value at initial contact (a position similar to the position of FIG. 5 with the first and second arms 30, 40 rotated in the direction X until the second arm 40 contacts the container 400 (likely at the top edge 401) and with continued rotation lowers to a smaller acute angle α as depicted in FIG. 6. FIG. 6 depicts the linkage 19 in the second position, i.e. with the shaft 25 fully extended from the air cylinder 23.

Figure 8A:
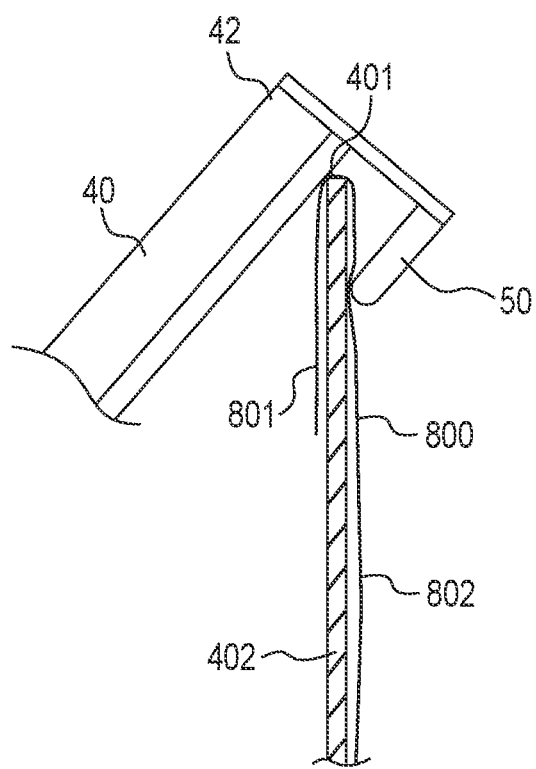
FIG. 8a is a first detail view of detail R of FIG. 6.
Figure 8B:
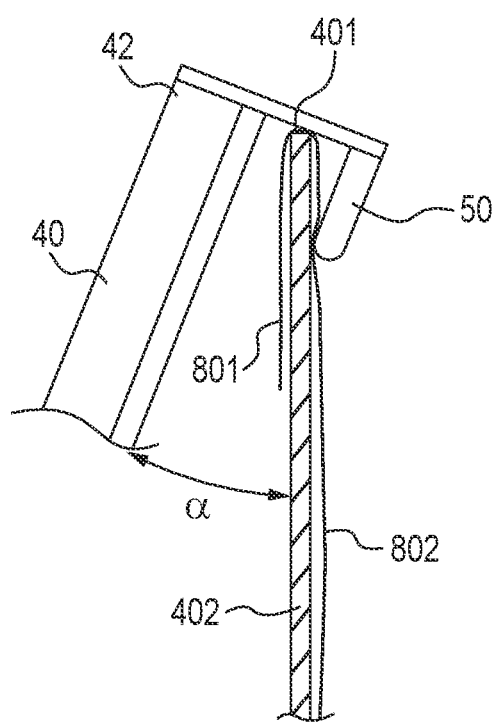
FIG. 8b is another detail view of detail R of FIG. 6.

When the linkage 19 reaches the second position, the differential pressure across the piston 28 still establishes a force upon the piston. This force is transferred to the first arm, which is then transferred to the second arm due to the spring 900, which causes the second arm 40 (and/or the hook 50) to apply a force to the container. As depicted in FIG. 6, the second arm 40 may contact the upper edge 401 of the container, or in some embodiments the side wall 402 of the container. This contact applies a force to the container 400 due to the biasing force of the spring 900. As depicted in FIG. 8a, the hook 50 may engage and apply a force to the inner surface of the side wall 402 of the container and the second arm engages the side wall 402 of the container 400. FIG. 8b depicts the second arm 40 (particularly a portion of the second arm that connects the hook 50 to the second arm 40) engaging the upper edge 401 of the container, with the hook 50 engaging the inner surface of the side wall 400. In these figures, the second arm 40 and the hook are compressing the bag 800 between the engagements with the container. This engagement prevents the bag 800 from sliding with respect to the container 400 as discussed below.

As depicted in FIGS. 5 and 6, a bag 800 may be positioned within the container, and specifically between the side wall 402 of the container 400 and the contents of the container, shown schematically as 4000 in FIG. 5. The bag 800 may extend above the upper edge 401 of the container and outside of the container (801). The portion of the bag 800 within the side walls of the container is identified as element 802. The bag 800 when between the second arm 40 and/or hook 50 and the container 400 establish a compressive force between the arm/bag/container or hook/bag/container which prevents sliding of the bag with respect to the container.

Figure 7:
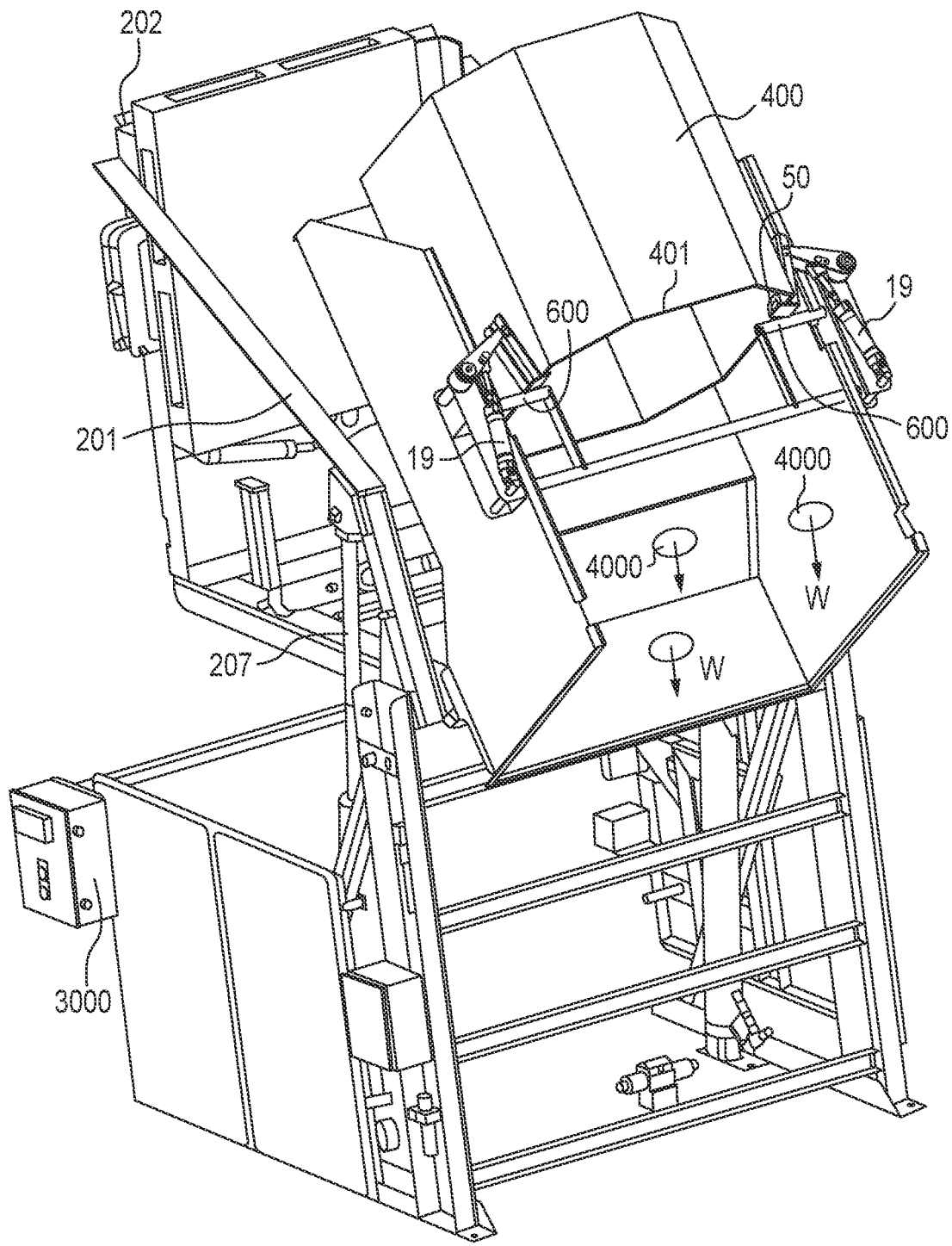
FIG. 7 is schematic view of the chute in a dumping position depicting the linkage in the engaged position.
Figure 7A:
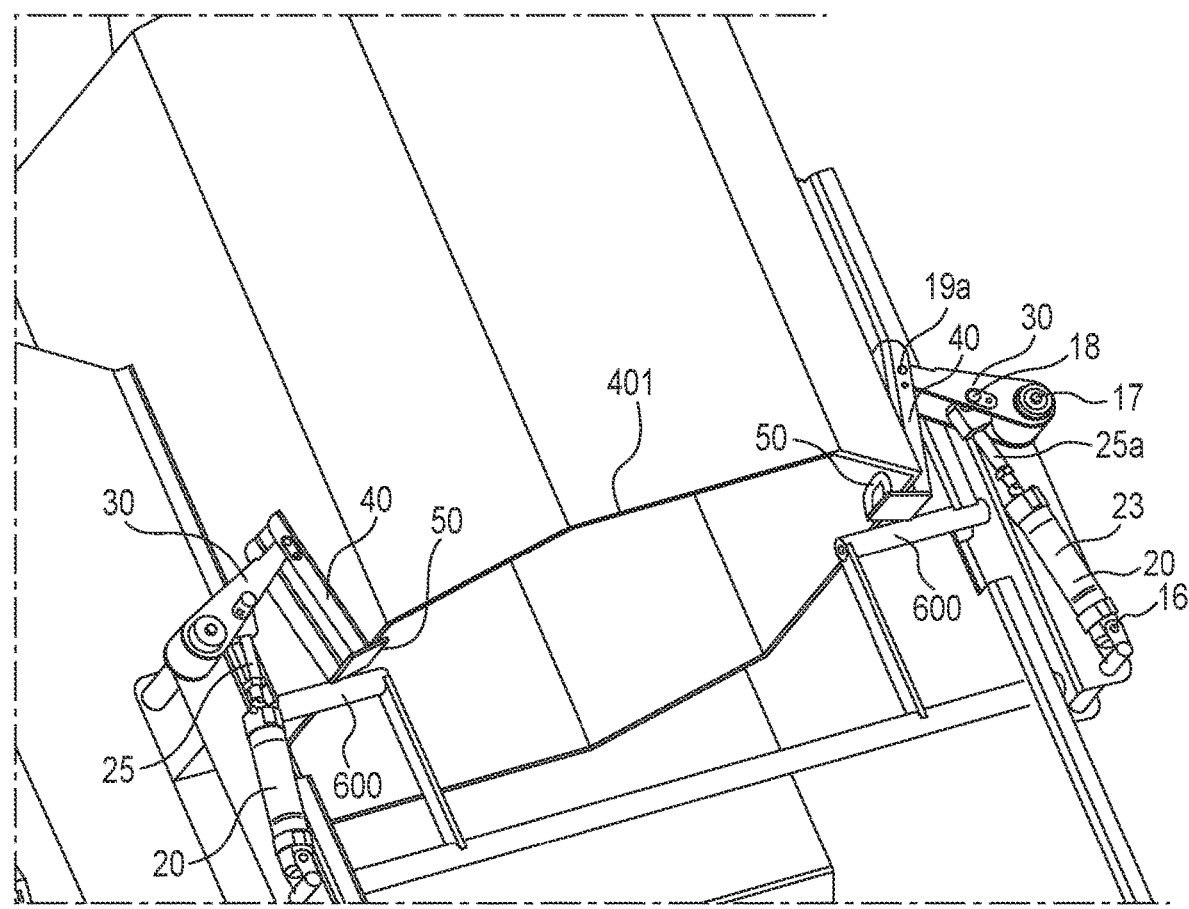
FIG. 7a is a detail view of FIG. 7.

The linkage 19 is configured to remain in the second position as the chute is moved and pivoted toward the position to allow the contents of the container 400 to be dumped out of the container due to gravity (as shown schematically in FIG. 7 with the contents 4000 falling from the container in the direction W). Specifically, when the linkage 19 is in the engaged position the hook 50 and/or the second arm 40 remain in engagement with the top edge 401 or the side wall 401 of the container, with the bag 800 disposed therebetween. As can be understood with respect to FIG. 7, as the chute is rotated, the force of gravity begins to urge the container off of contact with the floor 202 (either direct contact, or contact with a skid therebetween. As the container moves within the chute, the top edge 401 of the container 400 (or the side wall 402) applies a force F1 (FIG. 7) upon the hook 50 or the second arm 40. This force F1 causes the second arm to move due to the force of gravity in the direction of F1, which causes the first arm 30 to rotate in the direction Y. Rotation of the first arm 30 applies a force F2 to the shaft 25, which changes the force balance upon the piston 28 within the air cylinder 23, which causes the piston 28 (and therefore the shaft 25) to translate within the air cylinder 23, which increases the second volume (B) within the air cylinder 23 and decreases the first volume (A). This movement of the linkage 19 allows for the container 400 to move within the chute due to the force of gravity, and until the upper edge 401 of the container 400 contacts the hold down bar 600, as depicted in FIG. 7. The freedom of the linkage 19 to move allows the linkage 19 to move with the movement of the container 400, which prevents, for example, the top edge 401 and side walls of the container 400 from tearing, which might occur if the linkage did not have an play to move in the directions F1 and F2 due to the weight of the container when the chute is in the dumping position.

The movement of the linkage 19 in this dumping situation allows the second arm and/or hook to maintain engagement with the side wall 402 and/or the top edge 401 of the container, with the bag 800 therebetween, which prevents the bag from falling out of the container 400 when the contents of the container are being dumped.

In use, the system operates as follows. A container 400, which includes contents 4000 that are disposed within a bag 800 is positioned within the chute is disposed upon a floor 202 of the chute, while the linkage 19 is in the withdrawn position, which provides the hook 50 and the portion of the second arm 40 that is in-line with the location within the chute where containers 400 will be introduced to the chute are at a position vertically above the hold down bar 600 (distance Z) to prevent interference between the linkage 19 and side loading the container 400. When the container 400 is positioned, the controller 3000 transfers the linkage 19 to the engaged position. Specifically, the controller 3000 increases the relative pressure within the air cylinder 23 in the first volume (A), which establishes a downward force upon the piston 28 that increases the volume of the first volume (A). This translates the shaft 25 along its length such that the second end 25b of the shaft further extends outside of the air cylinder 23.

Movement of the shaft 25 transfers a force to the first arm 30, which causes first arm 30 to rotate in the direction X about pivot point 17. Rotation of the first arm 30 causes similar rotation of the second arm 40 due to the biasing force of the spring 900 about the pivot point 19.

After sufficient rotation of the second arm 40, the second arm and hook 50 lower below the hold down bar 600, and with sufficient rotation, the second arm 40 and/or the hook 50 engage the container 400. This engagement prevents further rotation in direction X and with continued rotation of the first arm 30, causes the second arm 40 to pivot with respect to first arm in the direction Y.

When the second arm 40 first engages the container 400, the angle α between the longitudinal axis 1001 through the second arm 40 and the side wall 402 continues to decrease due to the continued rotation of the first arm 30.

Eventually the controller 3000 discontinues adding high pressure air to the first volume (A) of the air cylinder 23, which allows the differential pressure across the piston 28 to stabilize, therefore halting the motion of the shaft 25 and the rotation of the first and second arms 30, 40. The spring 900 continues to bias the second arm 40 with respect to the first arm to urge the second arm in a rotational direction toward the same rotational orientation of the first arm 30 although the container 400 (top edge 401 or side wall 402) prevent the second arm 40 from moving. This force upon the second arm 40 causes the second arm (and/or hook) to apply a force to the container, with the bag 800 sandwiched between the second arm 40 or hook 50 and the container 400. This establishes a frictional force upon the bag 800 to prevent the bag from moving with respect to the container and second arm 40/hook 50 at the point of contact.

The chute is moved and rotated by the hydraulic system 207, which partially or fully turns over the container 400 to allow the contents 4000 to fall out of the container due to the force of gravity. As the container is turned over, a force (due to the weight of the container and for a period of rotation the weight of the contents 4000) is applied to the second arm 40 or hook 50 as the container wants to slide along the chute due to the force of gravity. This force applied to the second arm 40 is transferred to the first arm and the shaft 25, which when the force is high enough to create a differential pressure across the piston 28 causes the shaft 25 to translate along its length such that the second end 25*b* slides toward the air cylinder 23. The translation of the shaft 25 allows the first arm 23 to rotate in the direction Y, which allows the second arm 40 to move along with movement of the container 400 due to the force of gravity, while maintaining engagement with the container 400 to retain the bag 800 therebetween. Once the contents 4000 are dumped as desired the chute is returned to the normal position. If the container 400 upon the floor 202 of the chute is to be removed, the controller 3000 decreases the pressure within the first chamber (A) which causes the shaft 25 to translate further into the air cylinder 23, which causes the first arm to rotate in the direction Y, and due to the biasing force of the spring 900 causes the second arm 40 to rotate, which removes the engagement with the container 400 (and the bag 800) and lifts the portion of the second arm 40 and hook 50 that is aligned with the container above the hold down bar 600, which allows the container 400 and bag 800 to be removed from the floor 202 of the chute.

The figures depict a system with two linkages 19, each positioned on opposite sides of the chute. The system preferably operates the linkages simultaneously such that the respective second arms 40 or hooks 50 engage the opposite sides of the container 400 simultaneously with the bag 800 therebetween. Simultaneously is defined herein as at the same time or within a short period of time, such as less than 3-5 seconds). In other embodiments, the system may include three linkages 19 that simultaneously or sequentially engage the container 400.

In some embodiments, the hook 50 is configured to engage the side wall 402 and the bag therebetween when the linkage is in the engaged position. The differential air pressure across the piston 28 within the air cylinder 23 causes the shaft 25 to apply a downward force upon the first arm 30 (urging the first urge toward rotation in the direction X), which is transferred to the second arm 40 and results in the hook 50 applying a force upon the side wall 402. This force has a horizontal component which pushes the side wall of the container outward. This outward movement of the side wall 402 and change in the cross-sectional geometry of the container 400 toward an elliptical shape (especially when two linkages are used that press opposite side walls 402) which may tend to result in some movement of the components 4000 within the container (such if the components are somewhat frozen together), which may make the components 4000 more readily fall out of the container when the chute is rotated to a dumping position with the linkages in the engagement position.

Another benefit of the disclosed embodiments is that the bag 800 is retained with respect to the container 400 due to the one or more linkages 19, while minimizing the structure that extends or over the inner cross-section of the container 400 to minimize any interference with the components of the linkage 19 with the path that components 4000 fall out of the container when the chute is rotated into a dumping position.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The subject disclosure is exemplified by the following numbered paragraphs:

Numbered Paragraph 1: A system to retain a container, comprising:

a hopper comprising a chute, a floor, and a rotation mechanism which selectively moves the hopper from a first position where a container is supported upon the floor, and a second position wherein contents from within the container fall out of the container due to the force of gravity;

a retaining mechanism comprising, a linkage that pivots a second arm and a hook between a release position and a holding position, the linkage comprising an input, a first arm, and the second arm that supports the hook, and a fixed plate, the input is connected to the fixed plate at a first end thereof and where the input is additionally connected to the first arm such that movement of the input pivots the first arm, wherein the first arm is pivotably connected to the fixed plate;

the second arm is pivotably connected to the first arm at a second end of the first arm, a spring is disposed at the pivotable connection between the first and second arms and is provided to bias the second arm toward a position where the second arm extends along a line that is substantially parallel with a longitudinal axis through the first arm;

the hook extends from an extended end portion of the second arm.

Numbered Paragraph 2: The system of Numbered Paragraph 1, wherein the hook extends from the extended end portion of the second arm in a direction substantially parallel to a longitudinal axis through the second arm.

Numbered Paragraph 3: The system of either of Numbered Paragraphs 1 or 2, wherein the input is an air cylinder and a shaft, wherein the shaft includes a first portion and a piston disposed within the air cylinder and a second portion that extends out of the air cylinder, wherein an extended end of the second portion of the shaft is pivotably connected to the first arm, wherein the air cylinder has first and second air inputs, wherein when compressed air is received through the first input the shaft is urged to translate along a longitudinal axis of the shaft in a first direction where the extended end of the second portion of the shaft extends further away from the air cylinder toward to urge the second arm and hook toward the holding position where the second arm engages a container when the container is supported upon the floor of the chute, and a second input that when receiving compressed air therethrough causes the shaft translate along the longitudinal axis of the shaft in a second direction opposite to the first direction to urge the second arm and hook toward the release position where the second arm does not engage the container when the container is supported upon the floor of the chute.

Numbered Paragraph 4: The system of Numbered Paragraph 3, wherein allowing compressed air to flow into the air cylinder through the first air input increases a pressure within the air cylinder upon a first surface of the piston, and wherein allowing compressed air to flow into the air cylinder through the second air input increases a pressure within the air cylinder upon the opposite second surface of the piston, wherein the shaft is urged to translate along its longitudinal axis based upon differential air pressure across the piston within the air cylinder.

Numbered Paragraph 5: The system of Numbered Paragraph 4, wherein translation of the shaft in the first direction results in the first arm rotating in a direction such that the extended end of the first arm moves further away from the air cylinder.

Numbered Paragraph The system of Numbered Paragraph 5, wherein translation of the shaft in the first direction results in the second arm rotating in the same direction as the first arm until the second arm engages a side wall or an upper edge of the container when the container is positioned upon the floor of the hopper or the hook engages the side wall of the container when the container positioned upon the floor of the hopper.

Numbered Paragraph 7: The system of Numbered Paragraph 6, wherein when the second arm or the hook engages the side wall of the container, continued translation of the shaft in the first direction causes the second arm to rotate such that an angle between a longitudinal axis through the second arm and a side wall of the container forms an acute angle that continuously decreases, wherein the rotation of the second arm is additionally with respect to the longitudinal axis through the first arm and against the biasing force of the spring.

Numbered Paragraph 8: The system of Numbered Paragraph 7, wherein when the second arm or the hook engages the wall of the side wall of the container, the second arm or the hook contacts a bag that is disposed within the container.

Numbered Paragraph 9: The system of Numbered Paragraph 8, wherein the second arm contacts the bag that is positioned over the top edge of the container.

Numbered Paragraph 10: The system of Numbered Paragraph 8, wherein when the second arm and hook approach the holding position the second arm or the hook engages the container to create a pinch point between the respective second arm or hook and the bag.

Numbered Paragraph 11: The system of any one of Numbered Paragraphs 7-10, wherein when the second arm or the hook engages the side wall of the container, continued movement of the shaft causes the hook to urge the side wall of the container in an outward direction.

Numbered Paragraph 12: The system of any one of Numbered Paragraphs 6-11, wherein when the chute and a container that rests upon the floor of the chute is rotated by the rotation mechanism toward the second position, the second arm or the hook continues to engage the side wall of the container.

Numbered Paragraph 13: The system of Numbered Paragraph 12, wherein with sufficient rotation toward the second position, a force is applied to the shaft via the second and first arms due to the weight of the container due to gravity with rotation of the chute and container, wherein with sufficient rotation in the second direction the force from the container overcomes the force on the first side of the piston and the shaft translates in the second direction thereby allowing the second arm and hook to move a distance proportional to the translation of the shaft in the second direction to allow the container to no longer engage the floor of the hopper.

Numbered Paragraph 14: The system of Numbered Paragraph 13, wherein the hopper further comprises a holding bar, wherein the container contacts the holding bar to prevent further movement of the container as the chute and container are further rotated toward the second position by the rotation mechanism, wherein with rotation of the rotation mechanism the contents within the container are free to fall out of the container due to the force of gravity, and wherein when the contents fall out of the container a bag that is disposed between the side wall of the container and the contents within the container is maintained from falling with the contents due to the engagement between the second arm, the container and the bag or a pinched engagement between the hook, the bag, and the container.

Numbered Paragraph 15: The system of any one of the preceding Numbered Paragraphs, wherein the container rests upon a skid, which rests upon the floor of the chute to allow the container to be supported upon the floor of the chute.

Numbered Paragraph 16: The system of Numbered Paragraphs 3-15, wherein the hopper further comprises a holding bar that is disposed above a top edge of the container when the container is supported upon the floor of the chute, wherein when the second arm is in the release position the hook is disposed at a vertical position above the holding bar, wherein a container can be loaded upon the floor of the chute in a side loading direction resulting in a top edge of the container being disposed below the holding bar and without the container contacting the second bar or the hook.

Numbered Paragraph 17: A system to retain a container, comprising:

a hopper comprising a chute, a floor, and a rotation mechanism which selectively moves the hopper from a first position where a container is supported upon the floor, and a second position wherein contents from within the container fall out of the container due to the force of gravity;

a retaining mechanism comprising, a linkage that pivots a second arm and a hook between a release position and a holding position, the linkage comprising an input, a first arm, and the second arm that supports the hook, and a fixed plate, the input is connected to the fixed plate at a first end thereof and where the input is additionally connected to the first arm such that movement of the input pivots the first arm, wherein the first arm is pivotably connected to the fixed plate;

the second arm is pivotably connected to the first arm at a second end of the first arm, a spring is disposed at the pivotable connection between the first and second arms and is provided to bias the second arm toward a position where the second arm extends along a line that is substantially parallel with a longitudinal axis through the first arm;

the hook extends from an extended end portion of the second arm, wherein the input is an air cylinder and a shaft, wherein the shaft includes a first portion and a piston disposed within the air cylinder and a second portion that extends out of the air cylinder, wherein an extended end of the second portion of the shaft is pivotably connected to the first arm, wherein the air cylinder has first and second air inputs, wherein when compressed air is received through the first input the shaft is urged to translate along a longitudinal axis of the shaft in a first direction where the extended end of the second portion of the shaft extends further away from the air cylinder toward to urge the second arm and hook toward the holding position where the second arm engages a container when the container is supported upon the floor of the chute, and a second input that when receiving compressed air therethrough causes the shaft translate along the longitudinal axis of the shaft in a second direction opposite to the first direction to urge the second arm and hook toward the release position where the second arm does not engage the container when the container is supported upon the floor of the chute, wherein translation of the shaft in the first direction results in the second arm rotating in the same direction as the first arm until the second arm engages the container either upon a side wall or an upper edge thereof when the container is positioned upon the floor of the hopper or the hook engages the side wall of the container when the container positioned upon the floor of the hopper, wherein when the second arm or the hook engages the wall of the side wall of the container, the second arm or the hook contacts a bag that is disposed within the container, wherein the hopper further comprises a holding bar, wherein when the container is rotated in toward the second position by the chute by the rotation mechanism, the container contacts the holding bar to prevent further movement of the container, wherein with rotation of the rotation mechanism the contents within the container are free to fall out of the container due to the force of gravity, and wherein when the contents fall out of the container the bag is prevented from falling with the contents due to the engagement between the second arm, the container and the bag or a pinched engagement between the hook, the bag, and the container.

Numbered Paragraph 18: The system of Numbered Paragraph 17, wherein when the second arm or the hook engages the side wall of the container, continued translation of the shaft in the first direction causes the second arm to rotate such that an angle between a longitudinal axis through the second arm and a side wall of the container forms an acute angle that continuously decreases, wherein the rotation of the second arm is additionally with respect to the longitudinal axis through the first arm and against the biasing force of the spring.

Numbered Paragraph 19: The system of either Numbered Paragraphs 17 or 18, wherein when the second arm or the hook engages the side wall of the container, continued movement of the shaft causes the hook to urge the side wall of the container in an outward direction.

Numbered Paragraph 20: The system of any one of Numbered Paragraphs 17-19, wherein when the chute and a container that rests upon the floor of the chute is rotated by the rotation mechanism toward the second position, the second arm or the hook continues to engage the container.

Numbered Paragraph 21: The system any one of Numbered Paragraphs 17-20, wherein with sufficient rotation of the chute and the container resting thereon toward the second position, a force is applied to the shaft via the second and first arms due to the weight of the container due to gravity with rotation of the chute and container, wherein with sufficient rotation in the second direction the force from the container overcomes the force on the first side of the piston and the shaft translates in the second direction thereby allowing the second arm and hook to move a distance proportional to the translation of the shaft in the second direction to allow the container to no longer engage the floor of the hopper.

Numbered Paragraph 22: The system of any one of Numbered Paragraphs 17-21, wherein the container rests upon a skid, which rests upon the floor of the chute to allow the container to be supported upon the floor of the chute.

The invention claimed is:

1. A system to retain a container, comprising:
    a hopper comprising a chute, a floor, and a rotation mechanism which selectively moves the hopper from a first position where a container is supported upon the floor, and a second position wherein contents from within the container fall out of the container due to the force of gravity;
    a retaining mechanism comprising, a linkage that pivots a second arm and a hook between a release position and a holding position, the linkage comprising an input, a first arm, and the second arm that supports the hook, and a fixed plate,
    the input is connected to the fixed plate at a first end thereof and where the input is additionally connected to the first arm such that movement of the input pivots the first arm, wherein the first arm is pivotably connected to the fixed plate;
    the second arm is pivotably connected to the first arm at a second end of the first arm, a spring is disposed at the pivotable connection between the first and second arms and is provided to bias the second arm toward a position where the second arm extends along a line that is substantially co-linear with a longitudinal axis through the first arm;
    the hook extends from an extended end portion of the second arm,
    wherein the input is an air cylinder and a shaft, wherein the shaft includes a first portion and a piston disposed within the air cylinder and a second portion that extends out of the air cylinder, wherein an extended end of the second portion of the shaft is pivotably connected to the first arm, wherein the air cylinder has first and second air inputs, wherein when compressed air is received through the first input the shaft is urged to translate along a longitudinal axis of the shaft in a first direction where the extended end of the second portion of the shaft extends further away from the air cylinder to urge the second arm and hook toward the holding position where the second arm engages a container when the container is supported upon the floor of the chute, and a second input that when receiving compressed air therethrough causes the shaft to translate along the longitudinal axis of the shaft in a second direction opposite to the first direction to urge the second arm and hook toward the release position where the second arm does not engage the container when the container is supported upon the floor of the chute, wherein translation of the shaft in the first direction results in the second arm rotating in the same direction as the first arm until the second arm engages the container either upon a side wall or an upper edge thereof when the container is positioned upon the floor of the hopper or the hook engages the side wall of the container when the container positioned upon the floor of the hopper, wherein when the second arm or the hook engages the wall of the side wall of the container, the second arm or the hook contacts a bag that is disposed within the container, wherein the hopper further comprises a holding bar, wherein when the container is rotated in toward the second position by the chute by the rotation mechanism, the container contacts the holding bar to prevent further movement of the container, wherein with rotation of the rotation mechanism the contents within the container are free to fall out of the container due to the force of gravity, and wherein when the contents fall out of the container the bag is prevented from falling with the contents due to the engagement between the second arm, the container and the bag or a pinched engagement between the hook, the bag, and the container.

2. The system of claim 1, wherein when the second arm or the hook engages the side wall of the container, continued translation of the shaft in the first direction causes the second arm to rotate such that an angle between a longitudinal axis through the second arm and a side wall of the container forms an acute angle that continuously decreases, wherein the rotation of the second arm is additionally with respect to the longitudinal axis through the first arm and against the biasing force of the spring.

3. The system of claim 1, wherein when the second arm or the hook engages the side wall of the container, continued movement of the shaft causes the hook to urge the side wall of the container in an outward direction.

4. The system of claim 1, wherein when the chute and a container that rests upon the floor of the chute is rotated by the rotation mechanism toward the second position, the second arm or the hook continues to engage the container.

5. The system of claim 1, wherein with sufficient rotation of the chute and the container resting thereon toward the second position, a force is applied to the shaft via the second and first arms due to the weight of the container due to gravity with rotation of the chute and container, wherein with sufficient rotation in the second direction the force from the container overcomes the force on the first side of the piston and the shaft translates in the second direction thereby allowing the second arm and hook to move a distance proportional to the translation of the shaft in the second direction to allow the container to no longer engage the floor of the hopper.

6. The system of claim 1, wherein the container rests upon a skid, which rests upon the floor of the chute to allow the container to be supported upon the floor of the chute.

7. A system to retain a container, comprising:

a hopper comprising a chute, a floor, and a rotation mechanism which selectively moves the hopper from a first position where a container is supported upon the floor, and a second position wherein contents from within the container fall out of the container due to the force of gravity;

a retaining mechanism comprising, a linkage that pivots a second arm and a hook between a release position and a holding position, the linkage comprising an input, a first arm, and the second arm that supports the hook, and a fixed plate, the input is connected to the fixed plate at a first end thereof and where the input is additionally connected to the first arm such that movement of the input pivots the first arm, wherein the first arm is pivotably connected to the fixed plate;

the second arm is pivotably connected to the first arm at a second end of the first arm, a spring is disposed at the pivotable connection between the first and second arms and is provided to bias the second arm toward a position where the second arm extends along a line that is substantially co-linear with a longitudinal axis through the first arm;

the hook extends from an extended end portion of the second arm.

8. The system of claim 7, wherein the hook extends from the extended end portion of the second arm in a direction substantially parallel to a longitudinal axis through the second arm.

9. The system of claim 7, wherein the input is an air cylinder and a shaft, wherein the shaft includes a first portion and a piston disposed within the air cylinder and a second portion that extends out of the air cylinder, wherein an extended end of the second portion of the shaft is pivotably connected to the first arm, wherein the air cylinder has first and second air inputs, wherein when compressed air is received through the first input the shaft is urged to translate along a longitudinal axis of the shaft in a first direction where the extended end of the second portion of the shaft extends further away from the air cylinder to urge the second arm and hook toward the holding position where the second arm engages a container when the container is supported upon the floor of the chute, and a second input that when receiving compressed air therethrough causes the shaft to translate along the longitudinal axis of the shaft in a second direction opposite to the first direction to urge the second arm and hook toward the release position where the second arm does not engage the container when the container is supported upon the floor of the chute.

10. The system of claim 9, wherein allowing compressed air to flow into the air cylinder through the first air input increases a pressure within the air cylinder upon a first surface of the piston, and wherein allowing compressed air to flow into the air cylinder through the second air input increases a pressure within the air cylinder upon the opposite second surface of the piston, wherein the shaft is urged to translate along its longitudinal axis based upon differential air pressure across the piston within the air cylinder.

11. The system of claim 10, wherein translation of the shaft in the first direction results in the first arm rotating in a direction such that the extended end of the first arm moves further away from the air cylinder.

12. The system of claim 11, wherein translation of the shaft in the first direction results in the second arm rotating in the same direction as the first arm until the second arm engages a side wall or an upper edge of the container when the container is positioned upon the floor of the hopper or the hook engages the side wall of the container when the container positioned upon the floor of the hopper.

13. The system of claim 12, wherein when the second arm or the hook engages the side wall of the container, continued translation of the shaft in the first direction causes the second arm to rotate such that an angle between a longitudinal axis through the second arm and a side wall of the container forms an acute angle that continuously decreases, wherein the rotation of the second arm is additionally with respect to the longitudinal axis through the first arm and against the biasing force of the spring.

14. The system of claim 13, wherein when the second arm or the hook engages the wall of the side wall of the container, the second arm or the hook contacts a bag that is disposed within the container.

15. The system of claim 14, wherein the second arm contacts the bag that is positioned over the top edge of the container.

16. The system of claim 14, wherein when the second arm and hook approach the holding position the second arm or the hook engages the container to create a pinch point between the respective second arm or hook and the bag.

17. The system of claim 13, wherein when the second arm or the hook engages the side wall of the container, continued movement of the shaft causes the hook to urge the side wall of the container in an outward direction.

18. The system of claim 12, wherein when the chute and a container that rests upon the floor of the chute is rotated by the rotation mechanism toward the second position, the second arm or the hook continues to engage the side wall of the container.

19. The system of claim 18, wherein with sufficient rotation toward the second position, a force is applied to the shaft via the second and first arms due to the weight of the container due to gravity with rotation of the chute and container, wherein with sufficient rotation in the second direction the force from the container overcomes the force on the first side of the piston and the shaft translates in the second direction thereby allowing the second arm and hook to move a distance proportional to the translation of the shaft in the second direction to allow the container to no longer engage the floor of the hopper.

20. The system of claim 19, wherein the hopper further comprises a holding bar, wherein the container contacts the holding bar to prevent further movement of the container as the chute and container are further rotated toward the second position by the rotation mechanism, wherein with rotation of the rotation mechanism the contents within the container are free to fall out of the container due to the force of gravity, and wherein when the contents fall out of the container a bag that is disposed between the side wall of the container and the contents within the container is maintained from falling with the contents due to the engagement between the second arm, the container and the bag or a pinched engagement between the hook, the bag, and the container.

21. The system of claim 10, wherein the hopper further comprises a holding bar that is disposed above a top edge of the container when the container is supported upon the floor of the chute, wherein when the second arm is in the release position the hook is disposed at a vertical position above the holding bar, wherein a container can be loaded upon the floor of the chute in a side loading direction resulting in a top edge of the container being disposed below the holding bar and without the container contacting the second bar or the hook.

22. The system of claim 7, wherein the container rests upon a skid, which rests upon the floor of the chute to allow the container to be supported upon the floor of the chute.

* * * * *